US011684932B2

(12) United States Patent
Carlos Gomes De Oliveira et al.

(10) Patent No.: US 11,684,932 B2
(45) Date of Patent: Jun. 27, 2023

(54) VINASSE TREATMENT PROCESS BY FLOTATION IN FLOW

(71) Applicant: DT ENGENHARIA DE EMPREENDIMENTOS LTDA, Barueri (BR)

(72) Inventors: João Carlos Gomes De Oliveira, Santana de Parnaíba (BR); Procópio Gomes De Oliveira Netto, Santana de Parnaíba (BR); Felipe Gomes De Oliveira, Santana de Parnaíba (BR); Daniel Gomes De Oliveira, Santana de Parnaíba (BR)

(73) Assignee: DT ENGENHARIA DE EMPREENDIMENTOS LTDA, Barueri (BR)

( * ) Notice: Subject to any disclaimer, the term of this patent is extended or adjusted under 35 U.S.C. 154(b) by 274 days.

(21) Appl. No.: 16/952,634

(22) Filed: Nov. 19, 2020

(65) Prior Publication Data

US 2021/0220841 A1  Jul. 22, 2021

(30) Foreign Application Priority Data

Jan. 17, 2020 (BR) .......................... 1020200010611

(51) Int. Cl.
| | | |
|---|---|---|
| *B03D 1/004* | (2006.01) | |
| *B01D 3/00* | (2006.01) | |
| *B03D 1/02* | (2006.01) | |
| *B03D 1/08* | (2006.01) | |
| *B03D 1/14* | (2006.01) | |
| *C02F 11/00* | (2006.01) | |
| *C02F 103/32* | (2006.01) | |

(52) U.S. Cl.
CPC ............. *B03D 1/004* (2013.01); *B01D 3/002* (2013.01); *B03D 1/028* (2013.01); *B03D 1/082* (2013.01); *B03D 1/145* (2013.01); *B03D 1/1493* (2013.01); *C02F 11/008* (2013.01); *B03D 2201/002* (2013.01); *C02F 2103/325* (2013.01); *C02F 2209/08* (2013.01)

(58) Field of Classification Search
CPC ...................................................... B03D 1/004
See application file for complete search history.

(56) References Cited

U.S. PATENT DOCUMENTS

2004/0129639 A1*  7/2004  Allen ........................ C02F 9/00
                                                            210/732

* cited by examiner

*Primary Examiner* — Peter Keyworth
(74) *Attorney, Agent, or Firm* — Browdy and Neimark, P.L.L.C.

(57) ABSTRACT

"VINASSE TREATMENT PROCESS BY FLOTATION IN FLOW", more precisely, it is a vinasse treatment process, by high performance flowing flotation system in industrial plants' facilities, resulting in obtaining concentrated vinasse sludge and treated vinasse, being said process comprised by vinasse treatment, which consists of treatment steps performed inside flotation tank, which comprises succession of coagulation systems and basins, flocculation, combined with aeration and oxygenation, in addition to a system of nano and micro bubbles in flotation basin, in which vinasse naturally flows into its storage tank, being said process results in formation of surface sludge and treated vinasse.

5 Claims, 5 Drawing Sheets

VINASSE TREATMENT PROCESS BY FLOTATION IN FLOW

TECHNICAL FIELD

This descriptive report refers to an application for an invention patent for a process to treat vinasse from a processes of sugar manufacture, distillation of alcohol and/or spirits, corn processing for ethanol production and an industry of fruit juice production, such as orange juice.

TECHNICAL STATE

Human activity causes environmental impacts. Even when destined for food production, all resulting residues must be properly treated and processed in order not to further pollute the environment.

Vinasse is a residue from sugar-alcohol industry, resulting from distillation process of sugarcane juice to obtain alcohol or ethanol, processing of corn to produce ethanol, and production of fruit juices, with a dark brown color and a strong characteristic odor.

In its composition, vinasse presents concentrations of nutrients such as Phosphorus and Nitrogen, but mainly Potassium, in addition to a high biochemical and chemical oxygen demand (BOD and COD), that is, a high load of organic matter, and has an acid pH, from 4.0 (four) to 4.5 (four and a half).

Since the establishment of Brazilian's Proálcool, agro-industrial sector in Brazil has shown accelerated growth in production of sugarcane and its derivatives, and is currently a world leader in this field. A process of producing alcohol, processing corn to produce ethanol, and producing fruit juices from distillation generates vinasse, also known as restilo, tiborna or vinhoto.

Analyzing then, residues from sugar-alcohol industry, from corn processing to ethanol production, and from fruit juice production, vinasse should be considered as one of most important residues, for two reasons: because of its high polluting/fertilizing potential and because of volume it generates. In theory, for each liter of alcohol produced, 10 (ten) to 15 (fifteen) liters of vinasse are generated.

Due to high concentration of organic matter (BOD and COD) and nutrients, disposal of vinasse directly into environment is dangerous and presents high polluting potential, resulting in eutrophication (superfertilization) of natural waters. Its arrangement in soil, without adequate monitoring, significantly changes physical-chemical properties such as pH and electrical conductivity.

Fertirrigation with vinasse is a very common practice in alcohol industry and distilleries in Brazil. This increase in ethanol production has led to increase in production of vinasse, causing a series of problems in environment due to its incorrect destination. Until the end of 1970's (seventies), its dumping in rivers was practiced, however, from this date on, there was a prohibition of this act, generating a fine to anyone who violated this rule.

Currently, fertirrigation is used as a substitute or complement to use of chemical fertilization, constituting a natural source of mineral nutrients, also contributing economically, since it considerably reduces costs with chemical fertilization of sugarcane. However, using this application, there is a possibility of infiltration and contamination of water table.

The main reasons for wide diffusion of fertirrigation are: low initial investment required (decantation tanks, trucks, pumps and pipelines); low maintenance cost (people, diesel and electricity); quick disposal of vinasse in soil; gains compatible with investment (profits from recycling potassium in soil); reduced dependence on fertilizer inputs; does not involve complex technology and increased crop productivity.

However, direct infiltration in soil of vinasse is contaminant, causing increase in ion leaching (minerals present in more superficial layers of soil are transported to deeper layers), eutrophication, salinization, imbalance of nutrients, among other factors harmful to soil, water, plants and animals.

Still with all advantages mentioned, factors from environmental point of view must be taken into consideration, mainly considering long-term effects. With this, several initiatives to search for technologies or other legal solutions to solve this problem emerge. In addition, strict environmental standards have emerged, which have determined procedures and, consequently, influenced growing development of new technologies for treatment of vinasse.

Several ways and approaches to treating vinasse have already been tested, but most of them without success, some of them are: reverse osmosis; evaporation; incineration; aerobic lagoons; stabilization lagoons; biological filters; production of fungal or unicellular protein biomass; anaerobic digestion, etc.

OBJECTIVES AND ADVANTAGES OF INVENTION

The Applicant has extensive technical knowledge in high performance flotation systems, holding more than thirty patents on the subject, among them documents PI 9702430-0, PI 0105462-7, PI 0306256-2 and, more recently, BR102017026894-2, which is a variation of flotation process in flow, used exclusively for depollution of water courses contaminated with iron ore.

Although flotation process itself is already public knowledge and also special flotation processes are also public knowledge, none of these solutions, without significant changes, can treat vinasse.

In this way, having managed to develop a revolutionary process for flotation of iron ore, the Applicant used all his knowledge in flotation systems and developed a process to perform a flotation of vinasse in natural, to obtain concentrated vinasse sludge and treated vinasse, with high effectiveness in removing all substances present in vinasse.

Due to peculiarities of vinasse, flotation of vinasse has its own characteristics that are distinct from flotation of water, sewage and flotation of iron ore.

Due to fact that vinasse is a residue from an industrial activity with a great pollution load, it is possible to treat it inside an industrial complex, in vinasse storage tank itself, commonly found in industrial plants of this type and in natural and continuous flow of production of this residue, without need of building new treatment tanks.

An adaptation of vinasse tank where it is stored occurs through introduction of equipment and systems that will compose at least one stage of coagulation, with injection of organic and vegetal coagulant agents that react better and provide greater efficiency in removal of potassium, because conventional products standardized for conventional water treatment, sewage and ore (metallic salts), because they are inorganic, do not meet needs of application in treatment of vinasse, which is based on its suitability to meet high loads of polluting substances contained in vinasse, followed by a flocculation stage, with injection of organic and vegetal flocculating agents; followed by aeration and oxygenation stage for mixing of coagulants, oxidation of vinasse and formation of flakes; followed by injection of nano and micro air bubbles that adhere to flakes, following flotation stage, where referred flakes emerge to water surface, forming concentrated vinasse sludge, which is removed by gravity or pumping.

Due to this high removal of floated sludge, due to great load of organic matter in raw vinasse, modifications shall be made in dredging wheels to allow removal of this material, with an extended surface to receive sludge, increase of speed of rotation of scraping blades, increase of sludge storage box and increase of flow of sludge suction pumps. As it is a sludge of vegetable origin and has low levels of oils and fats, it will be necessary to cover an area of flotation basin, to prevent this sludge from defragmenting and decanting in treatment tank during periods of rain.

After removal, flotation sludge is deposited in suitable place for later use, and treated vinasse and concentrated vinasse sludge, rich in potassium and organic matter, will be reused in best possible way, as byproducts of sugar-alcohol industries or fruit juice production.

Additionally, to optimize treatment of vinasse, it is necessary to recirculate this vinasse already treated, collected after its flotation, whereas for treatment of stillage it is necessary to increase recirculation flow and consequently volume of micro and nano air bubbles to allow flotation of all this material, because, while in sewage recirculation is around 15 (fifteen) to 20 percent (twenty percent), for treatment of vinasse, recirculation goes up to 100 percent (one hundred percent) and consequently pressure in water/air vertical saturator will also be increased, depending on pollution levels of raw vinasse.

And, even vinasse to be treated with high temperatures, close to 70° C. (seventy degrees Celsius), its treatment was possible without cooling, since high temperatures increase kinetic energy of particles of reagents, increasing amount of effective shocks and speed of reactions, which ends up helping coagulation and flocculation of pollutants.

Thus, considering all difficulties, previous frustrated attempts and high costs of vinasse treatment, the Applicant inferred possibility of modifying in existing systems and methodologies of flotation treatment and its property, for specific treatment of vinasse.

Thus, the objective of this patent is to provide a vinasse treatment process by flow flotation of high performance, which is residue from sugarcane processing, in production of sugar, alcohol and spirits, from corn processing to ethanol production, and from fruit juice production.

Another objective is to provide fast and low-cost flotation treatment process that will be carried out in the industry's own production flow and inside the existing vinasse storage tank.

Moreover, as reflex objective, the present process of vinasse flotation treatment results in obtaining treated vinasse and concentrated vinasse sludge, rich in potassium and organic matter, which will be reused in agricultural production.

It is estimated that costs involved in transporting vinasse to fertirrigation will be reduced by about 75 percent (seventy-five percent), due to fertirrigation being done with concentrated vinasse sludge, which represents about 15 percent (fifteen percent) of vinasse flow in natural.

In addition, concentrated vinasse sludge presents lower infiltration rate in soil, providing more efficient fertilization and consequent reduction in cost of this application, due to significant reduction in purchase of potassium for fertilization, as well as it will eliminate problems of contamination of aquifers and groundwater bodies.

Another advantage of significant removal of Potassium and consequent concentration of this nutrient in concentrated vinasse sludge is that this vinasse sludge can be mixed with sludge from Sewage Treatment Plants and Slaughterhouse Effluent Treatment Plants, with tertiary level of treatment, which are rich in Phosphorus and Nitrogen, obtaining an organic fertilizer with high concentration of main macronutrients (N, P and K), for use in agriculture, reforestation, etc.

Still, as concentrated vinasse sludge has lot of organic matter and is saturated with oxygen, it will provide an increase in growth rate of sugarcane, corn or orange, improving the productivity of the plant.

DESCRIPTION OF THE FIGURES

To complement this description in order to obtain a better understanding of characteristics of vinasse treatment process by flow flotation in high performance, and according to preferential practical realization of same, set of drawings is attached, where, as an example, although not limitative, in which:

The FIG. 1A represents a sugar-alcohol plant and its structures, in simplified manner;

Figure 1A:
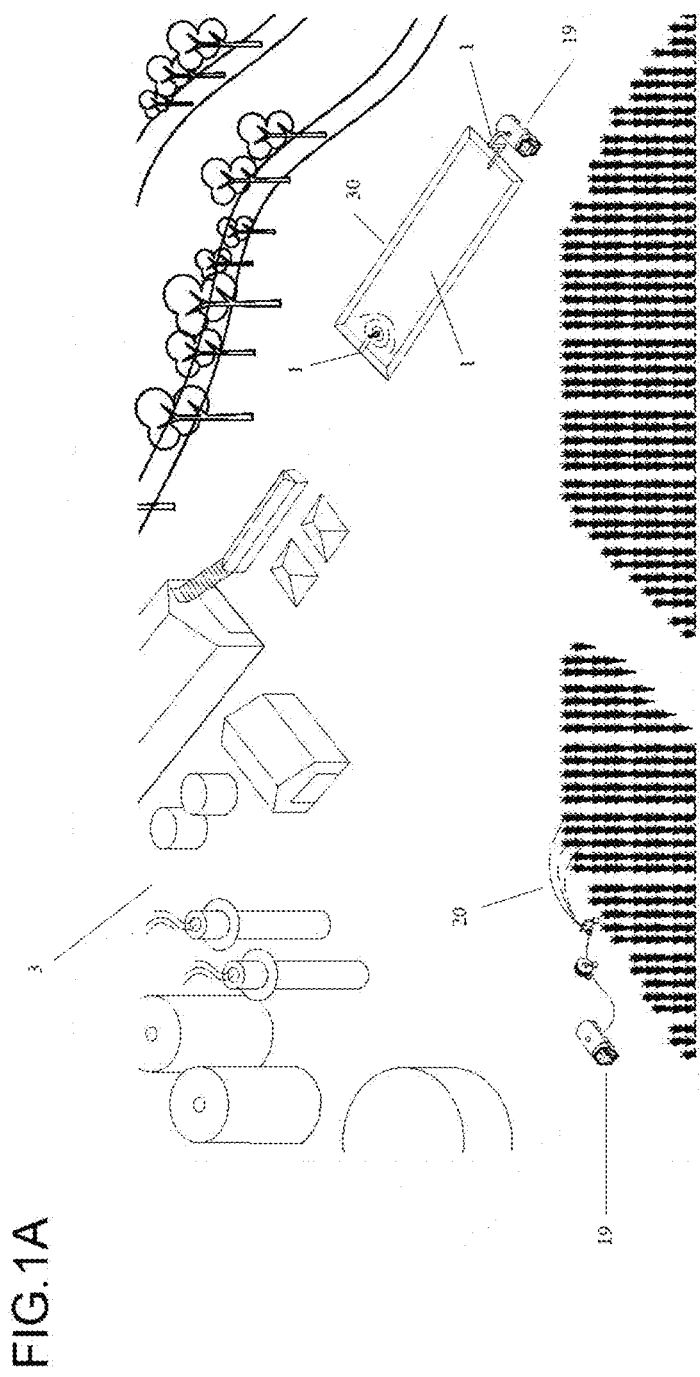
Figure 1B:
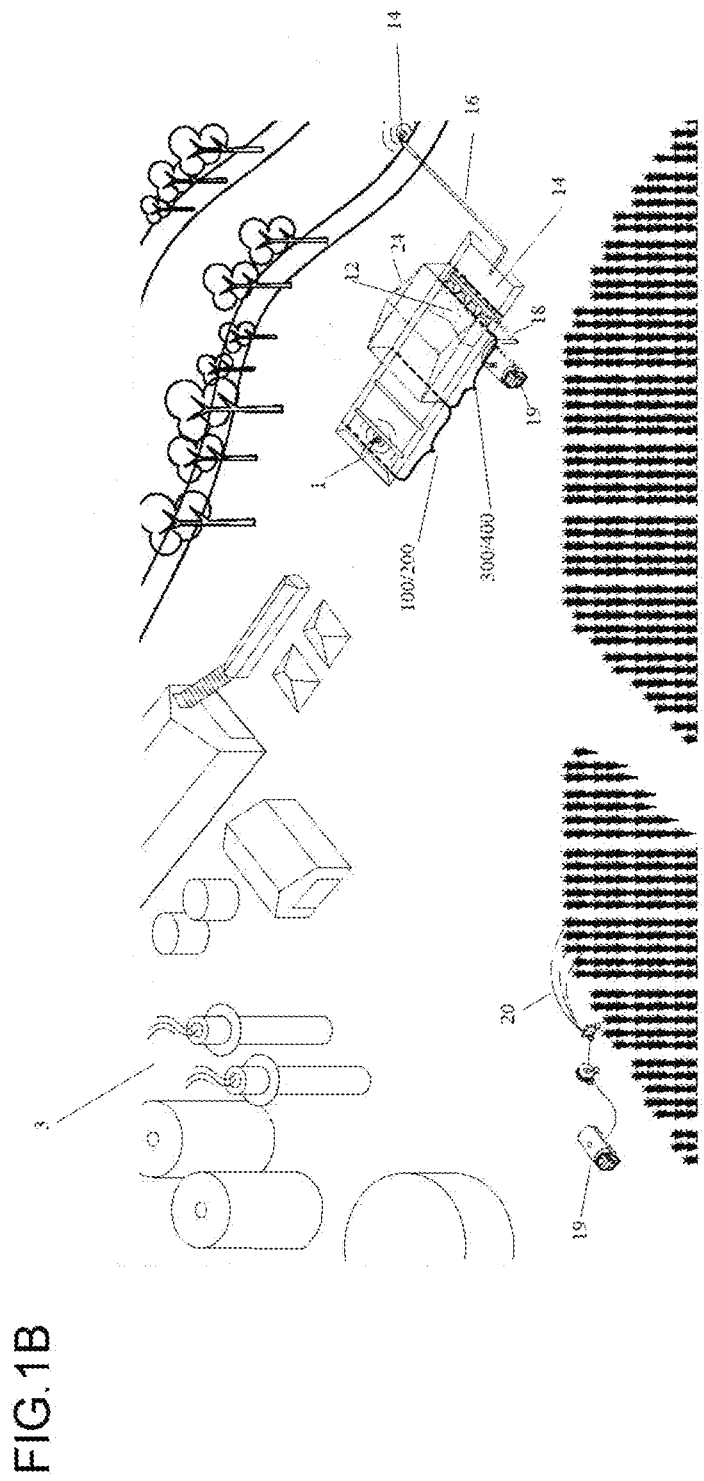
Figure 2A:
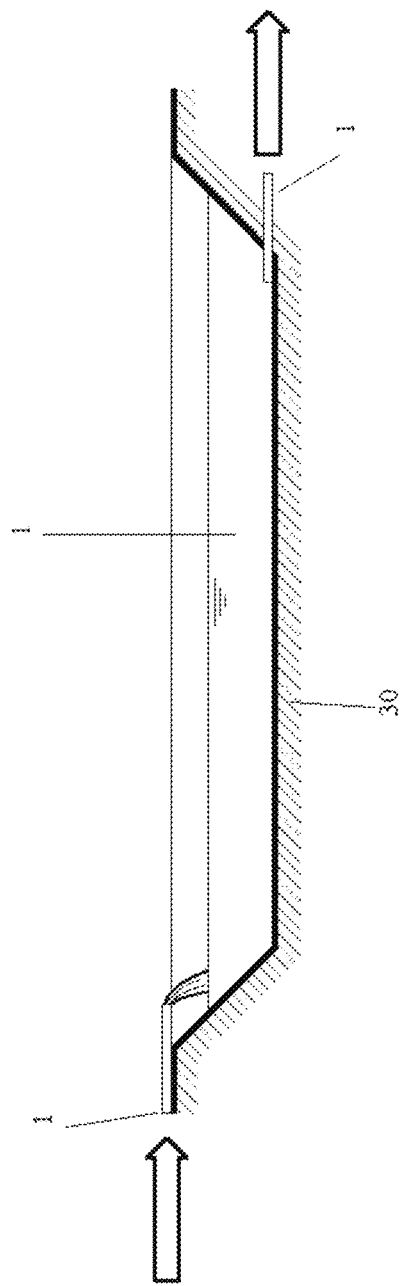
Figure 2B:
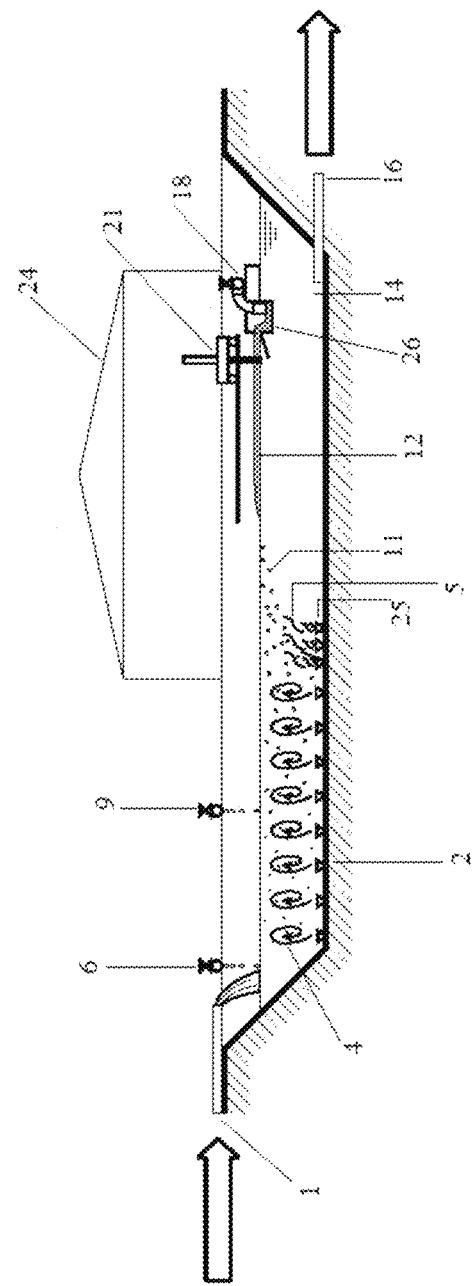
Figure 3:
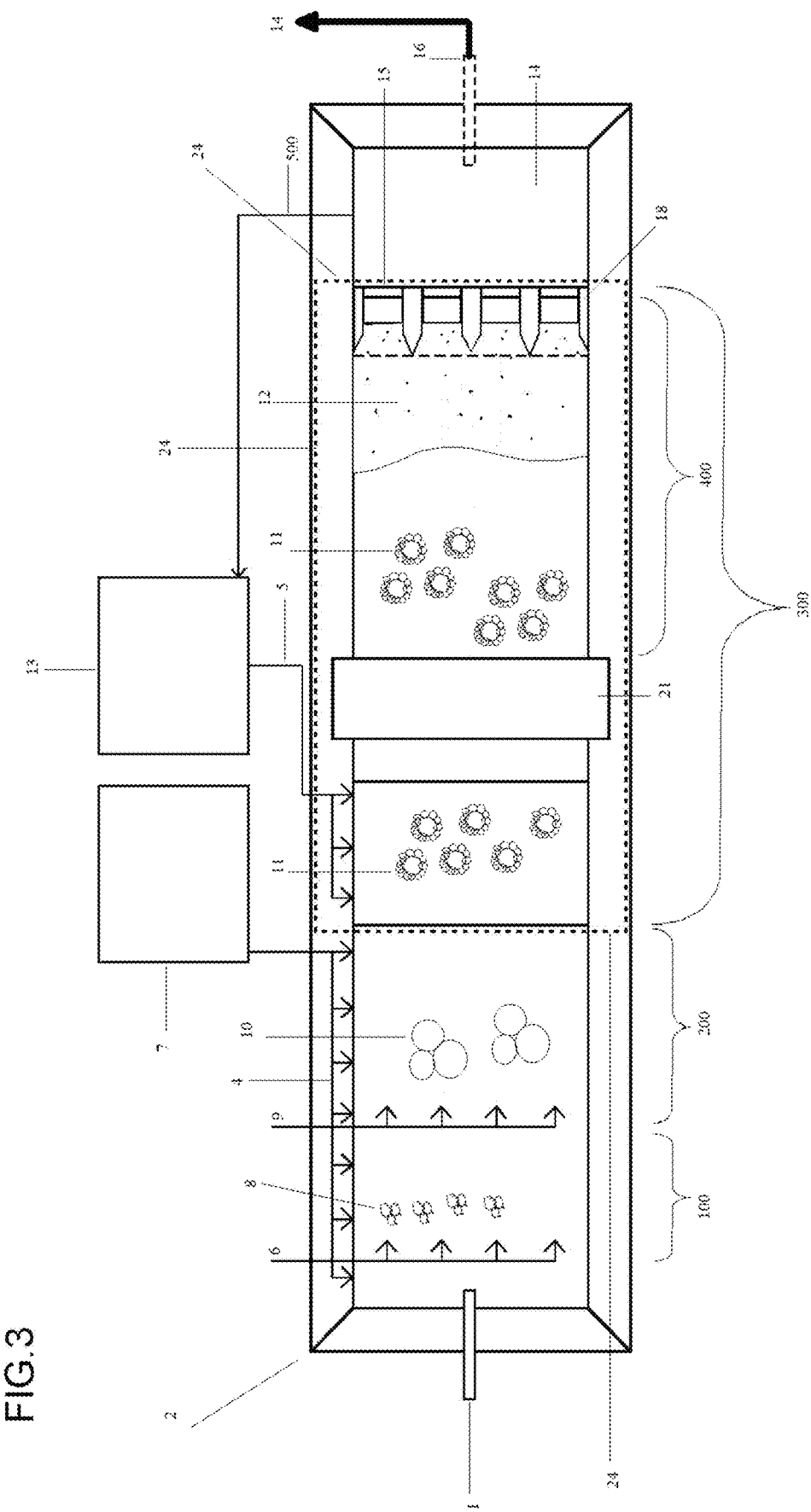

The FIG. 1B represents a sugar-alcohol plant and its structures, in simplified manner, and an adaptation of vinasse tank through introduction of equipment and flow flotation systems of high performance;

The FIG. 2A represents a longitudinal cut in vinasse storage tank commonly found in sugar-alcohol plants;

The FIG. 2B represents a longitudinal cut in vinasse storage tank commonly found in sugar-alcohol plants, adapted through introduction of equipment and flow flotation systems of high performance;

The FIG. 3 represents a top and schematic view of treatment process, demonstrating the steps and systems that make up treatment process;—

Figure 4:
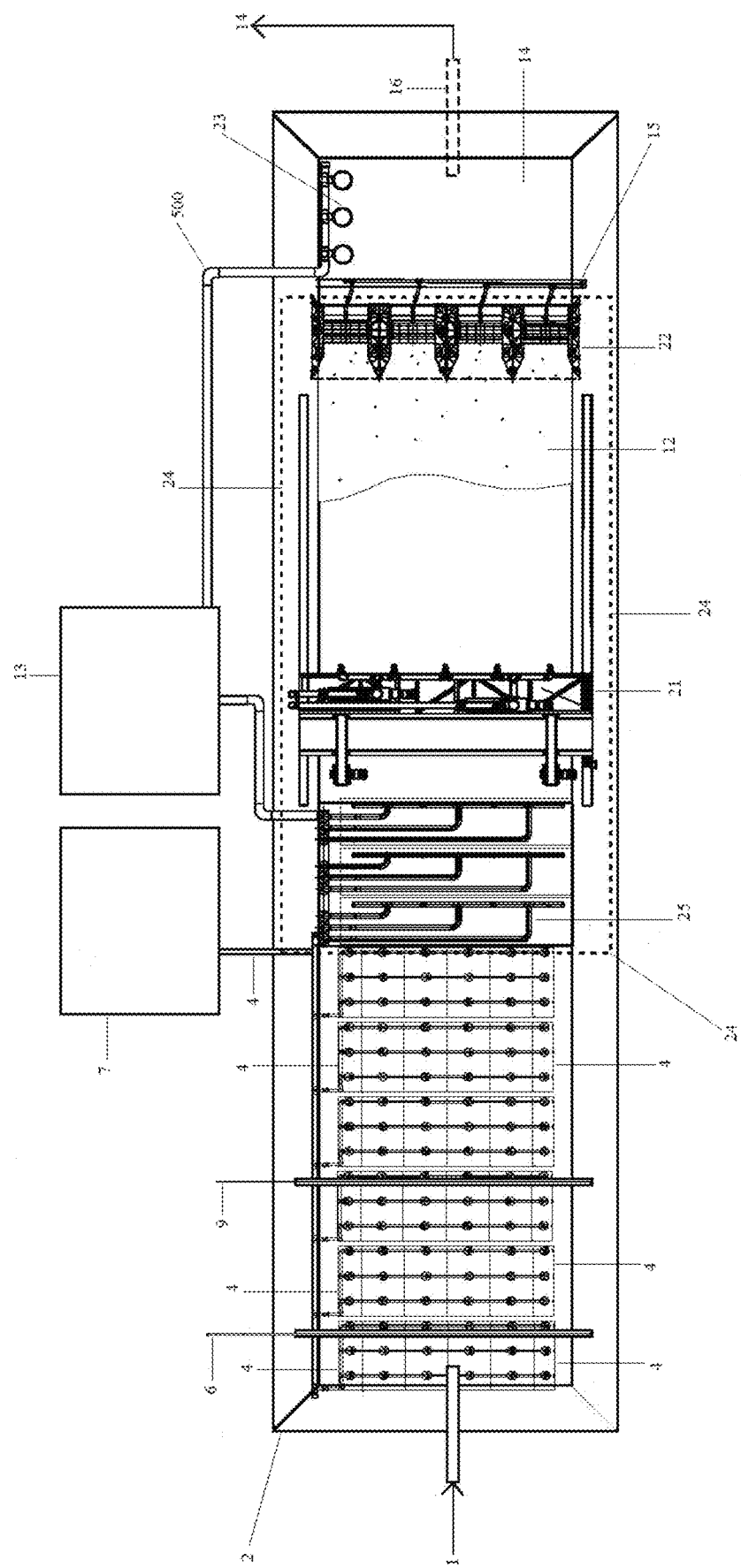

The FIG. 4 represents, in more detail, a top view of process in question, showing some equipment that composes it.

DETAILED DESCRIPTION OF THE OBJECT

With references to illustrated drawings, this privilege refers to a "VINASSE TREATMENT PROCESS BY FLOTATION IN FLOW", more precisely, it is a vinasse treatment process (1), by high performance flow flotation system, performed inside a industrial plant itself (3), taking advantage of vinasse storage (1) tank (30) already existing, with its transformation into flotation tank (2), resulting in obtaining concentrated vinasse sludge and treated vinasse.

This process is intended to treat vinasse (1) in natural, without need of cooling vinasse (1) to be treated, obtaining sludge (12) of concentrated vinasse and treated vinasse (14), being vinasse treatment process performed by flotation tank (2), in industrial plants' premises (3).

This process is comprised by a treatment of vinasse (1), which consists of treatment steps performed inside flotation tank (2), which comprises a succession of coagulation systems and basins (100), flocculation (200), combined with aeration and oxygenation (4), in addition to nano and micro-bubble system (5) in flotation tank (2), in which vinasse flows naturally inside its flotation tank (2), so-called process comprised by:—

Phase 1—Coagulation through a solution of organic and vegetal coagulants. This stage is performed in coagulation basin (100) and consists of applying solution of organic and vegetal coagulants (6) to raw vinasse (1), which react better and provide greater efficiency in removal of potassium, since conventional products standardized for conventional treatment of water, sewage and ore (metallic salts), since they are inorganic, do not meet needs of vinasse treatment application (1), which is based on their suitability to meet high loads of polluting substances contained in vinasse. During Phase 1 of Coagulation (100), a solution of modified organic and vegetal coagulants (6) is mixed in vinasse (1), through aeration and oxygenation system (4) at bottom of the flotation tank (2), through air blowers and oxygen concentrator equipment (7), as well as, oxidation of raw vinasse, which increases efficiency in removing all pollutants, thus forming vinasse clots (8) and, through natural flow, inside flotation tank, clotted vinasse (8) passes to Phase 2 of treatment.

Phase 2—Flocculation (200) with organic and vegetal flocculants (9). This step is carried out in flocculation basin (200) downstream of coagulation basin (100) and consists in application of organic and vegetal flocculants (9) in vinasse already coagulated (8) with organic and vegetal origin coagulant solution (6), formed in previous Phase 1. In present invention, an organic and vegetal flocculants (9) are mixed with vinasse through aeration and oxygenation system (4) at bottom of flotation tank (2), forming larger-sized flakes (10). It is worth mentioning that vinasse (1) has its own characteristics, having a lot of organic matter, about 30 times more than a domestic sewage, being exactly one of greatest challenges to make vinasse (1) coagulated (8), flocculated (10) and then floated; this activity is performed in Phase 3, next. Thus, from referred Phase 2 of flocculation (200) with organic and vegetal flocculants (9), vinasse flocculated with large flakes (10) results, which, through natural flow inside the flotation tank (2), vinasse flocculated (10) goes to next Phase 3.

Phase 3—Flotation (300) with nano and micro air bubbles injected. This phase is performed in flotation basin (300), downstream of flocculation basin (200) and consists of multiple and controlled release of mixture of saturated water with air, generating nano and micro air bubbles (5), which are released by pipeline (25) in flow of flocculated vinasse (10) formed in previous Phase 2. Such nano and micro air bubbles (5) are produced with specific and constant flow rate and diameter, appropriate to quantity and size of flake formed (10), such that, after nano and micro air bubbles (5) adhere to flakes (10), are formed flakes wrapped with air (11), on which thrust and consequent flotation of so-called flakes (11) acts, forming homogeneous mass of float sludge (12) on water surface and inside flotation tank (2) of flotation. Such nano and micro air bubbles (5) are produced by water/air vertical saturator type equipment (13) which has device to remove excess air to eliminate bubbles with diameters unsuitable for vinasse flotation (1).

In this Phase 3 treated vinasse (14) and vinasse sludge (12) are formed concentrated through successive and continuous phases: coagulation (100) with coagulants (6) organic and vegetal origin, flocculation (200) with flocculants (9) organic and vegetal origin and flotation with nano and micro air bubbles (5), proceeding to Phase 4.

Phase 4—Retention and removal of float sludge. This phase is performed in retention and removal basin (400) of float sludge (12) downstream of flotation basin (300) and comprises retention of float sludge (12), performed by a floating fence (15), located at end of flotation basin, still inside flotation tank (2), which retains surface sludge (12) of concentrated vinasse, and lets flow of treated vinasse (14) pass underneath it, and treated vinasse (14) is pumped or thrown by gravity (16) out of flotation tank (2), for desired destination, since it is practically free of contaminants. A removal of sludge (12) of concentrated vinasse is performed by adequate capture and pumping equipment (18), and sludge (12) of concentrated vinasse is conditioned in appropriate place or thrown into specific tank truck (19), for dosage of this sludge in agriculture as fertilizer (20). In this phase 4 a scraper (21) of sludge is also provided to ensure routing and removal of sludge (12) in capture and pumping equipment (18), as well as, a cover (24) over area of floated sludge (12), to ensure its stability on surface of vinasse treated in rainy events. Due to this high removal of floated sludge (12), modifications shall be made in dredging wheels (22) to allow removal of this material, with an extended surface to receive sludge (12), increase of the speed of rotation of scraping blades, increase in storage box (26) of sludge (12) and increase in flow of sludge (12) suction pumps (18).

Phase 5—Recirculation of treated vinasse. Additionally, treatment process comprises Phase 5 of recirculation (500) of treated vinasse (14), with collection (23) treated vinasse at a point downstream of Phase 4 of Retention and removal (400) of float sludge (12) to feed treated vinasse (14) into vertical water/air saturator type equipment (13), which provides injection of nano and micro air bubbles (5) in Phase 2 flotation (200), being treatment of vinasse requires increase in flow of recirculation (500) and consequent increase in volume of micro and nano air bubbles (5) to enable flotation of all this material, while in sewage recirculation is around 15 (fifteen) to 20% (twenty percent), for treatment of vinasse, recirculation (500) is increased to up to 100% (one hundred percent) and consequently pressure in water/air vertical saturator (13) will also be increased, depending on pollution levels of inlet vinasse (1).

Process works as follows: treatment is performed on natural vinasse flow and production (1) by industrial plant, which is directed to vinasse (1) storage flotation tank (2), inside of flotation tank (2) equipment and systems are introduced that will compose Phase 1 first, clotting (100), with solution of coagulants (6) organic and vegetal origin, forming clots (8) of vinasse and, through natural flow in flotation tank (2), coagulated vinasse (8) goes to Phase 2 of Flocculation (200) with flocculants (9) of organic and vegetal origin. In this phase 2, larger vinasse flakes (10) are formed with addition of organic and vegetal flocculants (9), which follows through natural flow to Phase 3 of Flotation (300), with injection of nano and micro air bubbles (5), which results in flotation by adherence of nano and micro air bubbles (5) in flakes (11), result of thrust, forming homogeneous mass of float sludge (12) on surface of treated vinasse, called concentrated vinasse sludge (12), which follows, through natural flow, to Phase 4 of retention and removal (400) of float sludge (12).

In this phase 4, floating fence (15) retains sludge (12) on surface of treated vinasse flow, and superficial retained sludge (12) is directed by scrapers (21) to capture and pumping equipment (18), which promote continuous removal of this superficial sludge (12), into its desired destination, being treated vinasse (14), which passes under floating fence (15), is directed by gravity or by pumping (16) out of flotation tank (2), to desired destination, since it is practically free of contamination.

Simultaneously, there is Phase 5 of Recirculation (500), with recirculation of treated vinasse (14) for equipment (13) that provides nano and micro air bubbles (5) in Phase 4 of flotation (400) with injection of nano and micro air bubbles (5), being such recirculation (500) in order of up to 100% (one hundred percent) and consequently pressure in vertical water/air saturator (13) will also be increased, depending on pollution levels of vinasse (1) inlet.

Surface sludge (12) removed, which consists of concentrated vinasse with low water content and high content of Potassium and organic matter, is packed in its own place or reused directly in agricultural fertilization (20).

Process of vinasse treatment by flotation in high performance flow provides results of high removal mainly of nutrient Potassium, organic matter and other substances present in vinasse (1) in natural. resulting in sludge (12) of concentrated vinasse and treated vinasse (14), which can be reused in industrial plant itself (3), providing fertirrigation in more controlled manner, due to sludge (12) containing less water in its composition and consequent reduction in amount of trucks (19) transporting this material.

Regardless of vinasse flow (1) to be treated, it is possible to dimension a flotation treatment plant in flow inside the vinasse (1) storage flotation tank (2) or build a new flotation tank (2) to meet needs of treatment process or industrial plant (3).

It should be noted that present process, in view of its specific characteristics and tests already conducted, can be used for treatment of vinasse (1) resulting from sugarcane processing activity, but also for treatment of vinasse (1) resulting from corn processing activity for ethanol production, in addition, in fruit juice production industry, such as orange juice, which also produces type of vinasse (1) that can be treated by present process.

Present development may receive modifications in construction, sizing, materials, functional configurations, relative to stages and process parameters, without leaving scope of protection of this privilege

The invention claimed is:

1. A vinasse treatment process by flotation in flow, carried out inside an industrial plant, in a vinasse storage tank itself, transformed into a flotation tank, commonly found in industrial plants of this type and in natural and continuous flow of vinasse production, without need of construction of new flotation tanks, the flotation tank being provided with a cover for flotation sludge, in which treatment of the vinasse is performed without need of raw cooling of the vinasse, wherein, in the flotation tank, various phases of the treatment of the vinasse are performed, which allows operation in continuous flow and with variable flows, the process comprising:

Phase 1—Coagulation through a solution of organic and vegetal coagulants, performed in a coagulation basin, at an entrance of the flotation tank, the coagulation comprising application, in the vinasse, of the solution of organic and vegetal coagulants, through an aeration and oxygenation system at a bottom of the flotation tank, through air blowers and oxygen concentrator equipment to mix coagulants, oxidation of the vinasse and formation of clots of the vinasse, which coagulated vinasse, through natural flow, inside the flotation tank, proceeds to Phase 2 of treatment;

Phase 2—Flocculation with organic and vegetal flocculants, performed in a flocculation basin, inside the flotation tank, downstream of the coagulation basin, comprising application of the organic and vegetal flocculants, in the vinasse already coagulated with the solution of organic and vegetal coagulants, formed in previous Phase 1, being the organic and vegetal flocculants mixed with the coagulated vinasse, through the aeration and oxygenation system at the bottom of the flotation tank, forming flakes having a large size, which flocculated vinasse, through natural flow inside the flotation tank, proceeds to Phase 3;

Phase 3—Flotation with injection nano and micro air bubbles, performed in a flotation basin, downstream of the flocculation basin, comprising multiple and controlled release of mixture of the vinasse treated with air, generating the nano and micro air bubbles, which are released by a pipeline in flow of the flocculated vinasse formed in previous Phase 2, the nano and micro air bubbles produced with flow and with a specific and constant diameter, appropriate to quantity and size of the flakes formed, such that, after adhesion of nano and micro bubbles in the flakes, the flakes are formed wrapped with the air, which rise to surface by thrust, forming a mass of the flotation sludge homogeneous on water surface and inside the flotation tank;

Phase 4—Retention and removal of the flotation sludge, performed in a retention and removal basin of the flotation sludge downstream of the flotation basin, inside the flotation tank, comprising retention of the flotation sludge, performed by floating fence, located at an end of the flotation basin, inside the flotation tank, which retains the flotation sludge of concentrated vinasse, allowing flow of treated vinasse to pass, under referred floating fence, which is pumped or thrown by gravity out of the flotation tank, and removal of the flotation sludge of the concentrated vinasse is performed by an adequate capture and pumping equipment, assisted by a scraper of the flotation sludge, which directs the flotation sludge to the capture and pumping equipment;

Phase 5—Recirculation of the treated vinasse, with collection of the treated vinasse at a point downstream of Phase 4 of retention and removal of the flotation sludge, to feed the treated vinasse in equipment of a vertical water/air saturation type, which provides injection of nano and micro bubbles in Phase 3 of flotation, such recirculation being in order of up to 100% (one hundred percent), depending on pollution levels of the vinasse.

2. The vinasse treatment process by flotation in flow according to claim 1, wherein the nano and micro air are injected by the pipeline in Phase 3, embedding the flakes with the nano and micro air bubbles of adequate dimensions to provide sufficient thrust force for flotation of the flakes of the concentrated vinasse.

3. The vinasse treatment process by flotation in flow according to claim 1, wherein the nano and micro air bubbles have specific and constant diameter, suitable for the flakes formed, so that, after absorption of the nano and micro air bubbles by the flakes, the flakes are formed incorporated with the air on which thrust acts suitable for flotation.

4. The vinasse treatment process by flotation in flow according to claim 3, wherein the nano and micro air bubbles are produced by the equipment of the vertical water/air saturation type, which has a device for removing excess of the air and elimination of bubbles with diameters unsuitable for flotation of the vinasse.

5. The vinasse treatment process by flotation in flow according to claim 1, wherein modified dredging wheels, with an extended surface for receiving the flotation sludge, are used with increased speed of rotation of blades of the scraper, increased storage of the flotation sludge, and increased flow of sludge suction pumps, due to amount of the flotation sludge produced.

* * * * *